(12) United States Patent
Nozawa

(10) Patent No.: US 6,496,582 B1
(45) Date of Patent: *Dec. 17, 2002

(54) INFORMATION PROCESSING APPARATUS AND METHOD THEREFOR

(75) Inventor: Shingo Nozawa, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/783,865

(22) Filed: Jan. 16, 1997

(30) Foreign Application Priority Data

Jan. 26, 1996 (JP) .............................. 8-012212

(51) Int. Cl.[7] .............................. H04K 1/00; H04K 1/04; H04K 1/06; H04L 9/00
(52) U.S. Cl. .............................. 380/37; 380/29; 380/216
(58) Field of Search .............................. 380/29, 32, 216

(56) References Cited

U.S. PATENT DOCUMENTS

| | | | | |
|---|---|---|---|---|
| 4,221,931 A | * | 9/1980 | Seiler | 380/35 |
| 5,010,405 A | * | 4/1991 | Schreiber et al. | 348/432 |
| 5,040,211 A | * | 8/1991 | Schreiber | 380/14 |
| 5,351,299 A | * | 9/1994 | Matsuzaki et al. | 380/37 |
| 5,384,849 A | * | 1/1995 | Jeong | 380/49 |
| 5,425,060 A | * | 6/1995 | Roberts et al. | 380/34 |
| 5,450,490 A | * | 9/1995 | Jensen et al. | 380/6 |
| 5,515,540 A | * | 5/1996 | Grider et al. | 380/4 |
| 5,530,959 A | * | 6/1996 | Amrany | 380/48 |
| 5,539,586 A | * | 7/1996 | Inoue et al. | 386/101 |
| 5,561,714 A | * | 10/1996 | Hershberger | 380/10 |
| 5,838,379 A | | 11/1998 | Takayama | |

* cited by examiner

*Primary Examiner*—Gilberto Barron
*Assistant Examiner*—Douglas J. Meislahn

(57) ABSTRACT

An information processing apparatus (and a method therefor) forms inputted digital information data into blocks which each correspond to a plurality of samples, orthogonally transforms the block data to form orthogonal transformed block data, and performs scrambling by transforming predetermined component data included in the orthogonal transformed block data. In addition, an information processing apparatus (and a method therefor) decodes scrambled, encoded data by decoding the encoded data, forming the decoded data into blocks which each correspond to predetermined data, transforming a predetermined coefficient included in the block data, and performing inversely-orthogonal-transformation of the transformed block data.

22 Claims, 3 Drawing Sheets

INFORMATION PROCESSING APPARATUS AND METHOD THEREFOR

BACKGROUND OF THE INVENTION

1. Field of the Invention

This invention relates to an information processing apparatus and a method therefor, and in particular to the scrambling of digital information data.

2. Description of the Related Art

Recently, with progress in digital signal information processing technology, a great amount of digital information such as moving pictures and still pictures can be recorded to small-sized magnetic media and can be transmitted to communications media by encoding the digital information with high efficiency.

As an application of such technology, an apparatus which enables only a specified user to decode a signal string by scrambling the string when encoding with high efficiency has been studied.

FIG. 1 shows a block diagram of a conventional information processing apparatus for scrambling a digital information signal.

As shown in FIG. 1, a block-forming unit 101 forms supplied digital information signal strings into blocks, corresponding to a finite number of signals. A rearranging unit 102 rearranges the block data strings which are sequentially supplied from the block-forming unit 101, in a predetermined order. A selector switch 103 selects either the block data string supplied from the block-forming unit 101 or the rearranged block data string supplied from the rearranging unit 102, and outputs the selected string. In other words, when the digital information signal needs to be scrambled, the block data string rearranged by the rearranging unit 102 is selected, while, when the signal does not need to be scrambled, the block data string from the block-forming unit 101 is selected.

In addition, the selector switch 103 also outputs a flag signal that represents which block data string has been selected.

FIG. 2 shows a block diagram of an information processing apparatus for decoding the scrambled digital information signal.

As shown in FIG. 2, a block-forming unit 201 forms a supplied signal string into blocks, corresponding to a finite number of signals. A rearranging unit 202 rearranges the block data strings which are sequentially supplied from the block-forming unit 201, in a predetermined order.

In accordance with the inputted flag signal, a selector switch 203 selects either the block data string supplied from the block-forming unit 201 or the rearranged block data string supplied from the rearranging unit 202, and outputs the selected string.

In other words, with respect to the scrambled information signal, the block data string rearranged by the rearranging unit 202 is selected, while, with respect to the information signal that has not been scrambled, the block data string from the block-forming unit 201 is selected.

The above-described conventional scrambling process requires the flag signal that represents whether or not scrambling has been performed, and it is essential that an apparatus and a recording medium, connected to the process, can respond to the flag signal. For example, the recording medium requires an extra recording region for recording the flag signal. As a result, disadvantageously, the recording medium has non-compatibility between the data format of the extra recording region and the data format of previous data. In addition, the conventional apparatus needs a large number of storage devices for data rearrangement for scrambling, which causes its circuit size to be large.

SUMMARY OF THE INVENTION

In view of the above-described background, it is an object of the present invention to provide an information processing apparatus and a method therefor which do not need an extra flag signal, and are capable of scrambling and decoding with a small-sized circuit.

To this end, according to an aspect of the present invention, the foregoing object has been achieved by the provision of an information processing apparatus or method including: input means (or a step) for inputting digital information data; block-forming means (or a step) for forming digital information data inputted to the input means (or step) into blocks, each corresponding to a plurality of samples; orthogonal transformation means (or a step) for orthogonally transforming the block data formed by the block-forming means (or step); and scrambling means (or a step) for transforming predetermined component data included in the orthogonal transformation data formed by the orthogonal transformation means (or step), to scramble the digital information data.

According to another aspect of the invention, the foregoing object has been achieved by the provision of an information processing apparatus for decoding data encoded by a process in which a digital information data is formed into blocks which each correspond to a plurality of samples, orthogonal transformation is performed with respect to the formed block data, a predetermined coefficient included in the orthogonal transformation data formed in the orthogonal transformation is transformed to scramble the digital information data, and the orthogonal transformation data including the transformed coefficient is encoded, the information processing apparatus (method) having: decoding means (or a step) for decoding the encoded data; block-forming means (or a step) for forming the decoded data into blocks which each correspond to a plurality of samples; inversion-scrambling means (or a step) for transforming a predetermined coefficient in the block data formed by the block-forming means (or step); and inversely-orthogonal-transformation means (or a step) for performing inversely-orthogonal-transformation of the block data outputted by the inversion-scrambling means (or step).

Other objects, features and advantages of the present invention will become apparent from the following detailed description and the attached drawings.

DESCRIPTION OF THE PREFERRED EMBODIMENT

An embodiment of the present invention will be described below.

Figure 1:
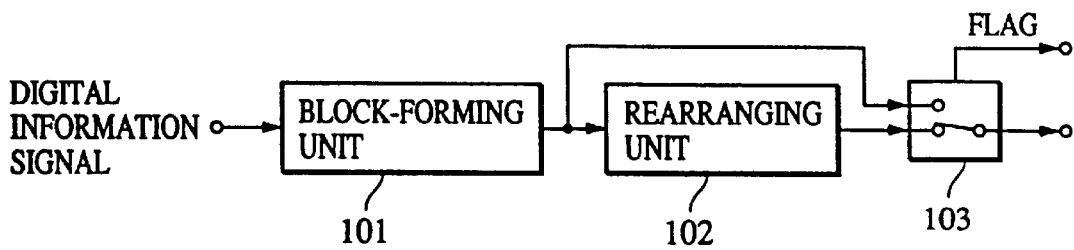
FIG. 1 is a block diagram showing a conventional information processing apparatus for scrambling a digital information signal.
Figure 2:
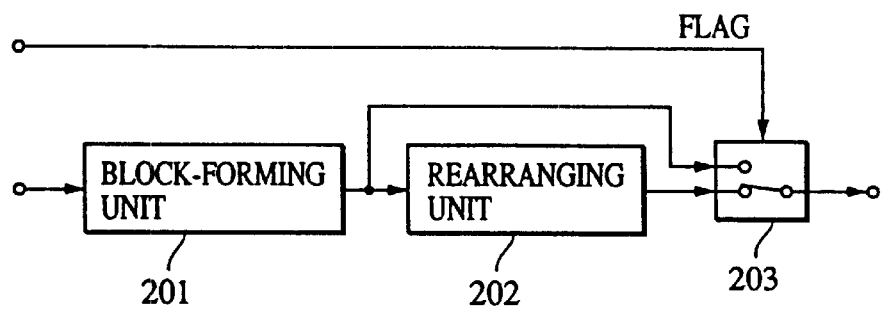
FIG. 2 is a block diagram showing a conventional information processing apparatus for decoding the scrambled digital information signal.
Figure 3:
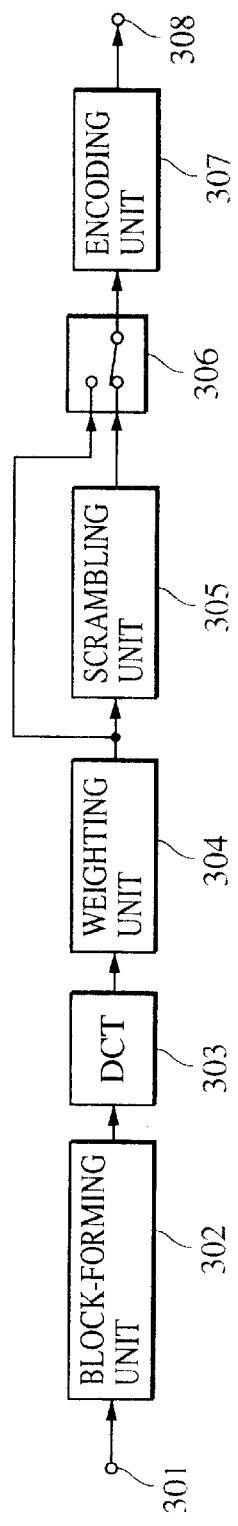
FIG. 3 is a block diagram showing a high-efficiency encoding apparatus according to the present invention.

FIG. 3 shows a block diagram of a high-efficiency encoding apparatus according to the present invention.

In connection with FIG. 3, a digital image signal that is formed by pixels having a range of −127 to +127 is inputted from an input terminal 301. A block-forming unit 302 separates the inputted digital image signal from the input terminal 301 into blocks having (8×8) pixels with eight vertical pixels and eight horizontal pixels, and supplies the blocks to an orthogonal transforming unit 303. The orthogonal transforming unit 303 performs two-dimensional discrete cosine transformation (DCT) of the (8×8) pixel-signal supplied from the block-forming unit 302, and supplies the transformed signal to the weighting unit 304.

The two-dimensional discrete cosine transformation for transforming the (8×8) pixel-string $\{p(h, v)\}$ ($0 \leq h \leq 7$, $0 \leq v \leq 7$) into an orthogonal component string $\{F(h, v)\}$ ($0 \leq h \leq 7$, $0 \leq v \leq 7$) is expressed by the following Equation (1):

$$F(h, v) = C(v)C(h)\sum_{y=0}^{7}\sum_{x=0}^{7}(p(x, y)\cos(\pi v(2y+1)/16)\cos(\pi h(2x+1)/16)) \quad (1)$$

$$C(h) = \begin{cases} \frac{1}{2\sqrt{2}} & (h = 0) \\ \frac{1}{2} & (h \neq 0) \end{cases}$$

The weighting unit 304 performs a process for enhancing compression effects, utilizing human visual characteristics, by multiplying a low range by a large coefficient and by multiplying a high range by a small coefficient. The following Equation (2) shows the weighting in the embodiment.

$$E(h, v) = \frac{1}{4\cos\left(\frac{\pi(8-h)}{32}\right)\cos\left(\frac{\pi(8-v)}{32}\right)} \times F(h, v) \quad (2)$$

The output E(h, v) of the weighting unit 304 has a range of −508 to +508, and is a 10-bit signal string in complementary expression on 2. The most significant bit is a sign bit that represents + and −.

However, the high range component E(7, 7) has only a range of −211 to +211, namely, a 9-bit signal range.

The scrambling unit 305 performs a scrambling process, utilizing such a property of the component, by executing exclusive OR operation or the like with the following Equation (3):

$$E'(h, v) = \begin{cases} E(h, v) & (h \neq 7 \vee v \neq 7) \\ E(h, v) \otimes 0111111111_2 & (h = v = 7) \end{cases} \quad (3)$$

(where ⓧ represents exclusive OR, and $0111111111_2$ represents 511 in a binary expression.)

Since the high range component E(7, 7) has only a 9-bit signal range, the most significant bit representing the sign and the second bit therefrom are always equal.

Also, in E'(7, 7) in which lower nine bits are inverted in the scrambling expressed by the equation (3), the most significant bit and the second bit therefrom are always different. Such output properties enable determination of whether or not the block is scrambled, without using the flag signal.

The scrambling unit 305 greatly changes the high range component of the block by inversion, thus realizing effective scrambling. Further, the scrambling unit 305 can perform a greater scrambling process by performing the same process with respect to E(7, 6) and E(6, 7).

A selector switch 306 selects one signal string from the signal string supplied from the weighting unit 304 and the signal string supplied from the scrambling unit 305, and outputs the selected signal string to an encoding unit 307.

The encoding unit 307 performs conventionally known loss-less compression encoding to the outputted signal string, and outputs the encoded signal string to an output terminal 308.

Figure 4:
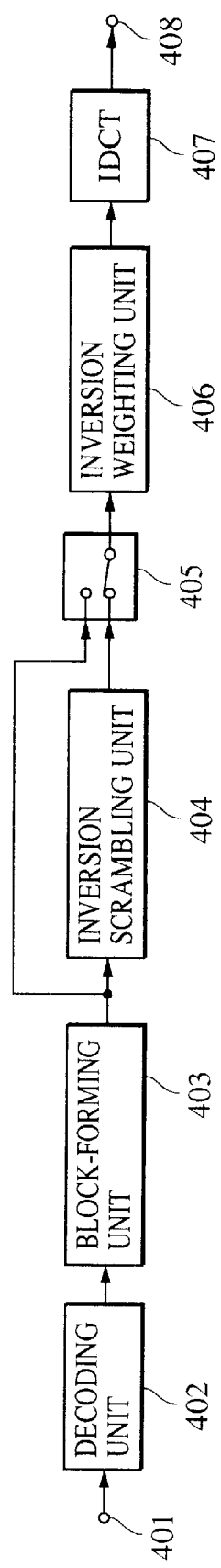
FIG. 4 is a block diagram showing a high-efficiency decoding apparatus according to the present invention.

FIG. 4 shows a block diagram of a high-efficiency decoding apparatus according to the present invention.

In connection with FIG. 4, a decoding unit 402 decodes the digital image signal, supplied from an input terminal 401, which has been processed by the loss-less compression. A block-forming unit 403 separates the digital image signal decoded by the decoding unit 402 into blocks, and supplies the separated blocks to an inversion scrambling unit 404.

The following Equation (4) expresses inversion scrambling in the embodiment, and uses exclusive OR operation or the like.

$$E(h, v) = \begin{cases} E(h, v) & (h \neq 7 \vee v \neq 7) \\ E(h, v) \otimes 0111111111_2 & (h = v = 7) \end{cases} \quad (4)$$

(where ⓧ represents exclusive OR, and $0111111111_2$ represents 511 in a binary expression.)

The inversion scrambling unit 404 transforms the block data string $\{E'(h, v)\}$ ($0 \leq h \leq 7$, $0 \leq v \leq 7$) supplied from the block-forming unit 403 into a block data string $\{E(h, v)\}$ ($0 \leq h \leq 7$, $0 \leq v \leq 7$), and supplies the transformed data string to a selector switch 405. The selector switch 405 selects either the block data string supplied from the block-forming unit 403 or the block data string supplied from the inversion scrambling unit 404, and outputs the selected data string to an inversion weighting unit 406.

In this case the selector switch 405 does not need a conventional, additional flag signal used for selecting one data string from both data strings.

The most significant bit and the second bit therefrom of the high range component E(7, 7) in the block data supplied from the block-forming unit 403 are compared. When they are equal, the signal string from the block-forming unit 403 is selected, while, when they are different, the signal string from the inversion scrambling unit 404 is selected. The inversion weighting unit 406 performs inversion weighting with respect to the block data string supplied from the selector switch 405 by using the following equation (5), and supplies the inversely weighted data string to an inversely orthogonal transformation unit 407.

$$F(h, v) = 4\cos\left(\frac{\pi(8-h)}{32}\right)\cos\left(\frac{\pi(8-v)}{32}\right) \times E(h, v) \quad (5)$$

In this embodiment the inversely orthogonal transformation unit 407 performs two-dimensionally inverse, discrete cosine transformation expressed by the following equation (6):

$$P(x, y) = \sum_{V=0}^{7} \sum_{h=0}^{7} (C(v)C(h)F(h, v)\cos(\pi v(2y+1)/16)\cos(\pi h(2x+1)/16)) \quad (6)$$

$$C(h) = \begin{cases} \dfrac{1}{2\sqrt{2}} & (h = 0) \\ \dfrac{1}{2} & (h \neq 0) \end{cases}$$

The data string decoded by the inversely orthogonal transformation unit 407 is outputted from an output terminal 408.

As described above, according to this embodiment, the flag signal that represents whether or not scrambling has been performed is not required. Therefore, the data capacity of the recording medium or the transmission medium can be reduced.

In addition, by using simple circuits such as an exclusive OR operator and a selector, effective scrambling in block units can be realized with a small circuit-size.

Figure 5:
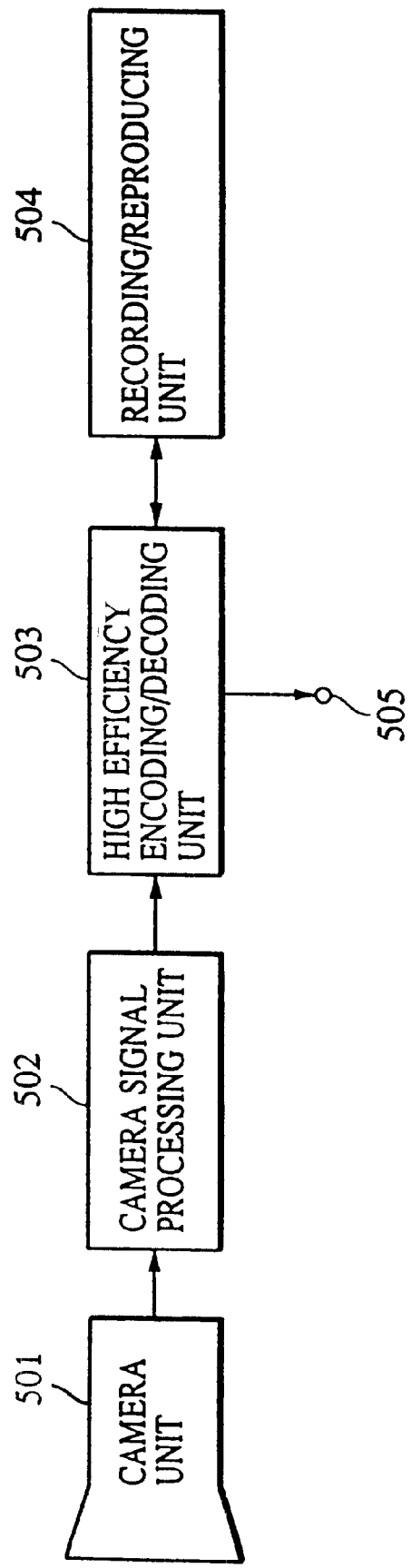
FIG. 5 is a block diagram showing a camera-incorporated recording/reproducing apparatus according to the present invention.

Further, by including the high-efficiency encoding/decoding apparatus according to this embodiment in an apparatus as shown in FIG. 5, the present invention can be applied to a camera-incorporated recording/reproducing apparatus.

By referring to FIG. 5, operation of the camera-incorporated recording/reproducing apparatus in the image recording condition will be explained.

The image of a subject is captured by a camera unit 501. A camera signal processing unit 502 performs predetermined digital color processing and the like with respect to the captured image signal, and the processed signal is inputted to a high efficiency encoding/decoding unit 503.

The high efficiency encoding/decoding unit 503, having structures as shown in FIGS. 3 and 4, encodes the inputted digital image signal, which is recorded to a recording medium such as a video tape or optical disc by a recording/reproducing unit 504.

Operation of the camera-incorporated recording/reproducing apparatus in the reproducing condition will be explained as follows:

Encoded data reproduced by the recording/reproducing unit 504 is decoded by the high efficiency encoding/decoding unit 503, and the decoded data is outputted in a digital form to an output terminal 505.

The decoded data may be outputted in an analog form by using a digital-to-analog converter in the output terminal 505.

According to the camera-incorporated recording/reproducing apparatus, shown in FIG. 5, which has been described, it is possible to perform scrambling with respect to the captured image data with the simplified structure of the apparatus.

The foregoing description of the embodiments has been given for the illustrative purposes only and not to be construed as imposing any limitation in every respect.

The scope of the present invention is, therefore, to be determined solely by the appended claims and not limited by the specification and alterations made within a scope equivalent to the scope of the claims which fall within the true spirit and scope of the present invention.

What is claimed is:

1. An image processing apparatus comprising:
   a) input means for inputting image data;
   b) block-forming means for forming block data from the image data, each block comprising a plurality of pixels;
   c) orthogonal transformation means for orthogonally transforming the block data formed by said block-forming means to form orthogonal transformation block data for each block comprising coefficient data for a plurality of components; and
   d) scrambling means for transforming coefficient data, included in the orthogonal transformation block data for each block, corresponding to only some of the plurality of components for the block without transforming coefficient data corresponding to other components of the plurality of components for the block, to scramble the image data.

2. An apparatus according to claim 1, further comprising output means for selectively outputting the orthogonal transformation block data obtained by said orthogonal transformation means or the orthogonal transformation block data obtained by said scrambling means.

3. An apparatus according to claim 2, further comprising encoding means for encoding the orthogonal transformation block data output by said output means.

4. An apparatus according to claim 1, wherein said scrambling means performs an exclusive OR operation with respect to the part of the coefficient component data by using a specified value.

5. An apparatus according to claim 1, wherein said scrambling means adds a specified value to the part of the coefficient component data.

6. An apparatus according to claim 1, wherein the part of the coefficient component data is a high range component.

7. An apparatus according to claim 1, wherein said input means includes imaging means for imaging an object and for generating the image data.

8. An apparatus according to claim 3, further comprising recording means for recording on a recording medium the image data encoded by said encoding means.

9. An apparatus according to claim 1, wherein said orthogonal transformation means includes weighting means for weighting the orthogonal transformation block data in accordance with a coefficient component region thereof.

10. An apparatus to claim 9, wherein said weighting means multiplies a low frequency component of the orthogonal transformation block data by a first coefficient, and multiplies a high frequency component of the orthogonal transformation block data by a second coefficient that is smaller than the first coefficient.

11. An image processing apparatus for decoding data encoded by a process in which (a) image data is formed into blocks that each correspond to a plurality of pixels, (b) orthogonal transformation is performed with respect to the formed block data to form orthogonal transformation block data for each block comprising coefficient data for a plurality of components, (c) coefficient data, included in the orthogonal transformation block data for each block, corresponding to only some of the plurality of components for the block without transforming coefficient data corresponding to other components of the plurality of components for the block, is transformed to scramble the digital information data, and (d) the orthogonal transformation block data including the transformed coefficient data is encoded, said image processing apparatus comprising:
   a) decoding means for decoding the encoded data to obtain orthogonal transformation data;
   b) block-forming means for forming the orthogonal transformation data decoded by said decoding means into blocks that each correspond to a plurality of pixels;
   c) descrambling means for transforming coefficient data in the block data formed by said block-forming means to descramble the image data; and d) inversely-orthogonal-transformation means for performing inversely-orthogonal-transformation of the block data output by said descrambling means.

12. An apparatus according to claim 11, wherein the encoded data is data reproduced from a recording medium.

13. An image processing method comprising:
   a) an input step of inputting image data;
   b) a block-forming step of forming block data from the image data, each block comprising a plurality of pixels;
   c) an orthogonal transformation step of orthogonally transforming the block data formed in said block-forming step to form orthogonal transformation block data for each block comprising coefficient data for a plurality of components; and
   d) a scrambling step of transforming coefficient data, included in the orthogonal transformation block data for each block, corresponding to only some of the plurality of components for the block without transforming coefficient data corresponding to other components of the plurality of components for the block, to scramble the image data.

14. An image processing method for decoding data encoded by a process in which (a) image data is formed into blocks that each correspond to a plurality of pixels, (b) orthogonal transformation is performed with respect to the formed block data to form orthogonal transformation block data for each block comprising coefficient data for a plurality of components, (c) coefficient data, included in the orthogonal transformation block data for each block, corresponding to only some of the plurality of components for the block without transforming coefficient data corresponding to other components of the plurality of components for the block, is transformed to scramble the image data, and (d) the orthogonal transformation block data including the transformed coefficient data is encoded, said image processing method comprising:
   a) a decoding step of decoding the encoded data to obtain orthogonal transformation data;
   b) a block-forming step of forming the orthogonal transformation data decoded in said decoding step into blocks that each correspond to a plurality of pixels;
   c) a descrambling step of transforming coefficient data in the block data formed in said block-forming step to descramble the image data; and
   d) an inversely-orthogonal-transformation step of performing inversely-orthogonal-transformation of the block data processed in said descrambling step.

15. A video camera comprising an image processing apparatus that comprises:
   a) input means for inputting image data;
   b) block-forming means for forming block data from the image data, each block comprising a plurality of pixels;
   c) orthogonal transformation means for orthogonally transforming the block data formed by said block-forming means to form orthogonal transformation block data for each block comprising coefficient data for a plurality of components; and
   d) scrambling means for transforming coefficient data, included in the orthogonal transformation block data for each block, corresponding to only some of the plurality of components for the block without transforming coefficient data corresponding to other components of the plurality of components for the block, to scramble the image data.

16. A video camera comprising an image processing apparatus for decoding data encoded by a process in which (a) image data is formed into blocks that each correspond to a plurality of pixels, (b) orthogonal transformation is performed with respect to the formed block data to form orthogonal transformation block data for each block comprising coefficient data for a plurality of components, (c) coefficient data, included in the orthogonal transformation block data for each block, corresponding to only some of the plurality of components for the block without transforming coefficient data corresponding to other components of the plurality of components for the block, is transformed to scramble the image data, and (d) the orthogonal transformation block data including the transformed coefficient data is encoded, wherein said image processing apparatus comprises:
   a) decoding means for decoding the encoded data to obtain orthogonal transformation data;
   b) block-forming means for forming the orthogonal transformation data decoded by said decoding means into blocks that each correspond to a plurality of pixels;
   c) descrambling means for transforming coefficient data in the block data formed by said block-forming means to descramble the image data; and
   d) inversely-orthogonal-transformation means for performing inversely-orthogonal-transformation of the block data output by said descrambling means.

17. A video recorder comprising an image processing apparatus that comprises:
   a) input means for inputting image data;
   b) block-forming means for forming block data from the image data, each block comprising a plurality of pixels;
   c) orthogonal transformation means for orthogonally transforming the block data formed by said block-forming means to form orthogonal transformation block data for each block comprising coefficient data for a plurality of components; and
   d) scrambling means for transforming coefficient component data, included in the orthogonal transformation block data for each block, corresponding to only some of the plurality of components for the block without transforming coefficient data corresponding to other components of the plurality of components for the block, to scramble the image data.

18. A video recorder comprising an image processing apparatus for decoding data encoded by a process in which (a) image data is formed into blocks that each comprise a plurality of pixels, (b) orthogonal transformation is performed with respect to the formed block data to form orthogonal transformation block data for each block comprising coefficient data for a plurality of components, (c) coefficient data, included in the orthogonal transformation block data for each block, corresponding to only some of the plurality of components for the block without transforming coefficient data corresponding to other components of the plurality of components for the block, is transformed to scramble the image data, and (d) the orthogonal transformation block data including the transformed coefficient data is encoded, wherein said image processing apparatus comprises:
   a) decoding means for decoding the encoded data to obtain orthogonal transformation data;
   b) block-forming means for forming the orthogonal transformation data decoded by said decoding means into blocks that each correspond to a plurality of pixels;
   c) descrambling means for transforming the coefficient data in the block data formed by said block-forming means to descramble the image data; and d) inversely-orthogonal-transformation means for performing inversely-orthogonal-transformation of the block data output by said descrambling means.

19. A video camera comprising means for performing an image processing method that comprises:

a) an input step of inputting image data;

b) a block-forming step of forming block data from the image data, each block comprising a plurality of pixels;

c) an orthogonal transformation step of orthogonally transforming the block data formed in said block-forming step to form orthogonal transformation block data for each block comprising coefficient data for a plurality of components; and d) a scrambling step of transforming coefficient data, included in the orthogonal transformation block data for each block, corresponding to only some of the plurality of components for the block without transforming coefficient data corresponding to other components of the plurality of components for the block, to scramble the image data.

20. A video camera comprising means for performing an image processing method for decoding data encoded by a process in which (a) image data is formed into blocks that each correspond to a plurality of pixels, (b) orthogonal transformation is performed with respect to the formed block data to form orthogonal transformation block data for each block comprising coefficient data for a plurality of components, (c) coefficient data, included in the orthogonal transformation block data for each block, corresponding to only some of the plurality of components for the block without transforming coefficient data corresponding to other components of the plurality of components for the block, is transformed to scramble the image data, and (d) the orthogonal transformation block data including the transformed coefficient data is encoded, wherein said image processing method comprises:

a) a decoding step of decoding the encoded data to obtain orthogonal transformation data;

b) a block-forming step of forming the orthogonal transformation data decoded in said decoding step into blocks that each correspond to a plurality of pixels;

c) a descrambling step of transforming coefficient data in the block data formed in said block-forming step to descramble the image data; and d) an inversely-orthogonal-transformation step for performing inversely-orthogonal-transformation of the block data processed in said descrambling step.

21. A video recorder comprising means for performing an image processing method that comprises:

a) an input step of inputting image data;

b) a block-forming step of forming block data from the image data, each block comprising a plurality of pixels;

c) an orthogonal transformation step of orthogonally transforming the block data formed in said block-forming step to form orthogonal transformation block data for each block comprising coefficient data for a plurality of components; and d) a scrambling step of transforming coefficient data, included in the orthogonal transformation block data for each block, corresponding to only some of the plurality of components for the block without transforming coefficient data corresponding to other components of the plurality of components for the block, to scramble the image data.

22. A video recorder comprising means for performing an image processing method for decoding data encoded by a process in which (a) image data is formed into blocks that each correspond to a plurality of pixels, (b) orthogonal transformation is performed with respect to the formed block data to form orthogonal transformation block data for each block comprising coefficient data for a plurality of components, (c) coefficient data, included in the orthogonal transformation block data for each block, corresponding to only some of the plurality of components for the block without transforming coefficient data corresponding to other components of the plurality of components for the block, is transformed to scramble the image data, and (d) the orthogonal transformation block data including the transformed coefficient data is encoded, wherein said image processing method comprises:

a) a decoding step of decoding the encoded data to obtain orthogonal transformation data;

b) a block-forming step of forming the orthogonal transformation data decoded in said decoding step into blocks that each correspond to a plurality of pixels;

c) a descrambling step of transforming coefficient data in the block data formed in said block-forming step to descramble the image data; and d) an inversely-orthogonal-transformation step of performing inversely-orthogonal-transformation of the block data processed in said descrambling step.

* * * * *

UNITED STATES PATENT AND TRADEMARK OFFICE
CERTIFICATE OF CORRECTION

PATENT NO. : 6,496,582 B1
DATED : December 17, 2002
INVENTOR(S) : Shingo Nozawa

It is certified that error appears in the above-identified patent and that said Letters Patent is hereby corrected as shown below:

Column 6,
Line 38, "to" should read -- according to --; and
Line 55, "digital information" should read -- image --.

Signed and Sealed this

Eighth Day of July, 2003

JAMES E. ROGAN
*Director of the United States Patent and Trademark Office*